US012063394B2

(12) United States Patent
Zheng

(10) Patent No.: US 12,063,394 B2
(45) Date of Patent: Aug. 13, 2024

(54) RECORDING VIDEO QUALITY

(71) Applicant: Alarm.com Incorporated, Tysons, VA (US)

(72) Inventor: Yang Yang Zheng, Richmond, VA (US)

(73) Assignee: Alarm.com Incorporated, Tysons, VA (US)

( * ) Notice: Subject to any disclaimer, the term of this patent is extended or adjusted under 35 U.S.C. 154(b) by 270 days.

(21) Appl. No.: 17/749,287

(22) Filed: May 20, 2022

(65) Prior Publication Data

US 2022/0394315 A1    Dec. 8, 2022

Related U.S. Application Data

(60) Provisional application No. 63/196,393, filed on Jun. 3, 2021.

(51) Int. Cl.
*H04N 21/234* (2011.01)
*H04N 21/2662* (2011.01)
*H04N 21/845* (2011.01)

(52) U.S. Cl.
CPC ... *H04N 21/23418* (2013.01); *H04N 21/2662* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 10,923,159 B1* | 2/2021 | ElDelgawy | G11B 27/11 |
| 11,741,805 B2* | 8/2023 | Slavin | G08B 13/19684 |
| | | | 348/152 |
| 2015/0071606 A1 | 3/2015 | Wintzell et al. | |
| 2016/0037167 A1* | 2/2016 | Wen | H04N 19/172 |
| | | | 375/240.07 |
| 2018/0173964 A1* | 6/2018 | Sha | H04N 7/18 |
| 2018/0191796 A1 | 7/2018 | Gandhi et al. | |
| 2018/0220189 A1 | 8/2018 | Hodge et al. | |
| 2020/0112726 A1 | 4/2020 | Liu et al. | |
| 2022/0394330 A1* | 12/2022 | Sai | H04N 19/40 |

OTHER PUBLICATIONS

PCT International Search Report and Written Opinion in International Appln. No. PCT/US2022/072463, mailed on Aug. 9, 2022, 9 pages.

* cited by examiner

*Primary Examiner* — Alexander Q Huerta
(74) *Attorney, Agent, or Firm* — Fish & Richardson P.C.

(57) ABSTRACT

Methods, systems, and apparatus, including computer programs encoded on computer storage media, for selecting a video quality. One of the methods includes: determining, for a repeating time range of a video with a first video quality, a frequency with which one or more portions of the video were accessed, each portion for a corresponding one of one or more past instances of the repeating time range; selecting, for the repeating time range and using the frequency with which the portion of the video for the repeating time range was accessed, a second video quality from two or more video qualities that includes the first video quality; and storing, in memory, one or more additional portions of the video i) captured by a camera during future instances of the repeating time range ii) at the second video quality.

20 Claims, 3 Drawing Sheets

RECORDING VIDEO QUALITY

CROSS-REFERENCE TO RELATED APPLICATION

This application claims the benefit of U.S. Provisional Application No. 63/196,393, filed Jun. 3, 2021, the contents of which are incorporated by reference herein.

TECHNICAL FIELD

This disclosure application relates generally to monitoring systems, and more particularly, to capturing video.

BACKGROUND

A monitoring system for a property can include various components including sensors, cameras, and other devices. A resident of the property may watch video captured by the cameras to see what happened at the property while the resident was away from the property.

SUMMARY

Techniques are described for scheduling recording video quality. A system can track portions of video that are viewed and determine a frequency that the various portions are watched. The frequency that video from various time ranges are watched may indicate a likelihood that video captured in the future during those time ranges will be watched. Video captured in the future that corresponds to time ranges more frequently watched can then be stored at a higher quality, and video captured in the future that corresponds to time ranges of less frequently watched can then be stored at a lower quality. Video quality can differ based on one or more of resolution, frame rate, image quality, and bit rate. Lower quality video may use less memory than higher quality video. Accordingly, the system may reduce memory used for storing video and increase a length of video that may be stored, while also providing high quality video for portions that are likely to be viewed.

In general, one innovative aspect of the subject matter described in this specification can be embodied in methods that include the actions of: determining, for a repeating time range of a video with a first video quality, a frequency with which one or more portions of the video were accessed, each portion for a corresponding one of one or more past instances of the repeating time range; selecting, for the repeating time range and using the frequency with which the portion of the video for the repeating time range was accessed, a second video quality from two or more video qualities that includes the first video quality; and storing, in memory, one or more additional portions of the video i) captured by a camera during future instances of the repeating time range ii) at the second video quality.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, each video quality in the two or more video qualities can have a corresponding resolution, a corresponding frame rate, a corresponding image quality, and a corresponding bit rate of a stream that encodes a respective portion of the video.

In some implementations, the second video quality can be different from the first video quality. In some implementations, the second video quality can be a lower video quality than the first video quality. In some implementations, the second video quality can be a higher video quality than the first video quality.

In some implementations, determining the frequency can include determining the frequency with which the one or more portions of the video were presented on a display, each portion for a corresponding one of the one or more past instances of the repeating time range.

In some implementations, the first video quality can have a first resolution, a first frame rate, a first image quality, and a first bit rate. Selecting the second video quality can include: selecting the second video quality that has a second resolution, a second frame rate, a second image quality, and a second bit rate. Storing the one or more additional portions of the video can include storing, in memory, the one or more additional portions of the video i) captured by the camera during future instances of the repeating time range ii) at the second resolution, the second frame rate, the second image quality, and the second bit rate.

In some implementations, storing the one or more additional portions of the video can include determining to compress the one or more additional portions of the video i) captured by the camera during future instances of the repeating time range ii) from the first video quality to the second video quality.

In some implementations, the method can include obtaining, for the one or more past instances of the repeating time range, viewing information that identifies a number of times the one or more portions of the video were accessed. Determining the frequency can include determining, for the repeating time range and using the viewing information, the frequency with which the one or more portions of the video were accessed, each portion for a corresponding one of the one or more past instances of the repeating time range.

In some implementations, determining the frequency can include determining the frequency with which the one or more portions of the video were accessed, each portion for a corresponding one of the one or more past instances of the repeating time range from a predetermined period of time.

In some implementations, the method can include capturing, by the camera, the one or more additional portions of the video at the second video quality. The method can include sending, to the camera, an instruction to cause the camera to capture the one or more additional portions of the video at the second video quality.

In some implementations, determining the frequency can include determining, for each of two or more of repeating time ranges including the repeating time range, a respective frequency with which one or more respective portions of the video were accessed, each respective portion for a corresponding one of the one or more past instances of the respective repeating time range. Selecting the second video quality can include selecting, for each of the two or more repeating time ranges including the repeating time range, a respective video quality from the two or more video qualities, at least two repeating time ranges in the two or more repeating time ranges having different respective video qualities. Storing the one or more additional portions of the video can include storing, in memory and for each of the two or more repeating time ranges, one or more respective additional portions of the video i) captured by the camera during respective future instances of the respective repeating time range ii) at the respective video quality.

In some implementations, the method can include determining whether to use three or more video qualities to store different portions of the video. In response to determining to use three or more video qualities to store different portions of the video, some implementations of the method can include: determining that a first portion of the one or more portions of the video has a first frequency that satisfies a threshold and should be maintained at the first video quality; determining that a second portion of the one or more portions of the video has a second frequency that does not satisfy the threshold and should be maintained at the second video quality. The second portion can be adjacent to the first portion in the video. Some implementations of the method can include: selecting, from the second portion, a third portion of the video that is adjacent to the first portion; and selecting, for a second repeating time range for the third portion that is adjacent to the first portion and the second portions, a third video quality from the three or more video qualities that includes the first video quality and the second video quality. The third video quality can be a different video quality than the first video quality and the second video quality. Some implementations of the method can include storing, in memory, one or more third portions of the video a) captured by the camera during future instances of the second repeating time range b) at the third video quality.

In some implementations, determining whether to use the three or more video qualities to store different portions of the video uses the frequency with which one or more portions of the video were accessed.

In some implementations, determining whether to use the three or more video qualities to store different portions of the video uses a duration of the first portion, a duration of the second portion, or both.

The subject matter described in this specification can be implemented in various embodiments and may result in one or more of the following advantages. In some implementations, by recording lower quality video for periods of time less likely to be viewed, the system can still continuously record and use a reduced amount of demanded memory and/or permanent storage, e. g., hard disk drives, solid state drives, or secure digital (SD) cards. Portions that are more likely to be watched can be maintained at a higher quality while portions that are less likely to be watched can be maintained at a lower quality, reducing an amount of memory required, increasing a duration of video content that can be stored, or both.

In some implementations, recording lower quality video for periods of time less likely to be viewed can lower network usage. For example, if the video recorder records camera footage over a network, e. g., a stream video recorder (SVR) or cloud recording, the system lowering the video quality settings of the camera for at least some portions of the video can reduce the amount of data transferred over the network from the camera to the video recorder.

The details of one or more implementations are set forth in the accompanying drawings and the description below. Other features will be apparent from the description and drawings, and from the claims.

DESCRIPTION OF DRAWINGS

Like reference numbers and designations in the various drawings indicate like elements.

DETAILED DESCRIPTION

Some systems can dynamically change a video quality at which video is captured. When a system change changes video quality based on "interesting events", the detection of the interesting events can demand high levels of processing power. Further, some continuous recording systems might not support retaining high quality video during interesting events. Additionally, in some instances, a system designed to record only "interesting events" in high quality may inadvertently record in high quality too often if the camera is in a busy place, e. g., a sidewalk with many pedestrians, and consequently use more storage.

To dynamically change a quality of video stored in memory, a system can determine frequencies with which various portions of a video stream were accessed. The portions can be for repeating time ranges, e.g., daily from 9-5 pm, weekends, or other appropriate time ranges. The system can use the access frequencies to determine a video quality for the corresponding portion of the video stream and store the portions according to the video quality.

Figure 1:
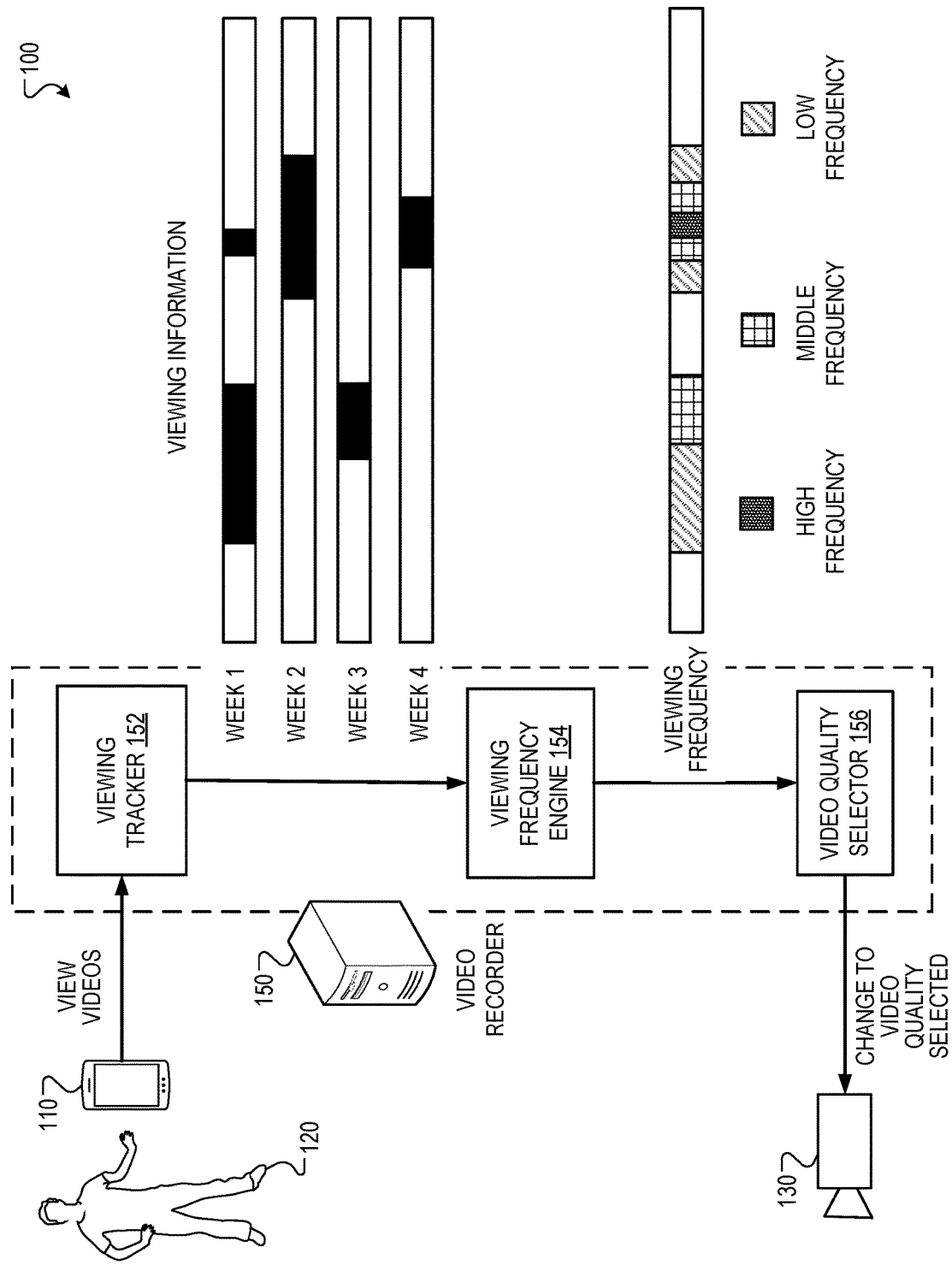
FIG. 1 illustrates a block diagram of an example system scheduling recording video quality.

FIG. 1 illustrates an example block diagram of an example system 100 for scheduling recording video quality. When continuously recording video from a camera to storage, the storage can get full quickly, especially if the storage space is small. Some scenarios when the storage space can be small may include, a camera storing video locally on a Secure Digital (SD) card with a small memory capacity, a video recorder that stores video received from the camera over a local area network has a hard drive with a small memory capacity, or a user has only subscribed to using a small memory capacity with a cloud video storage service.

An option to reduce storage usage is to only record video from a camera during certain time periods instead of all the time. However, users might prefer an alternative that does not completely disable recording during time periods other than the certain time periods. For example, users may prefer to continuously record at least some form of video at all times.

In some implementations, video may be recorded at a lower video quality than usual for times periods that users care less about or are less likely to look at footages for. This may help reduce the storage space used for the footages for those time periods. Determining which time periods to use which video quality may be manually specified by users. However, having video quality for different time periods be automatically determined by the system 100 may be more user friendly.

The system 100 includes a user device 110 which a user 120 can use to watch video, a video recorder 150 that determines a video quality for recording video, and a camera 130 that captures additional video in the future based on the video quality that was determined. For example, the user 120 may watch video through the user device 110 during a four week period of time and the video recorder 150 may then instruct the camera 130 which video quality to use at different time ranges in the future based on which time ranges of video that the user 120 watched during the four weeks.

The user device 110 may be a device that hosts and displays user interfaces. For example, the user device may be a mobile device that hosts one or more native applications (e.g., the native surveillance application). The user device may be a cellular phone or a non-cellular locally networked device with a display. The user device may include a cell phone, a smart phone, a tablet PC, a personal digital assistant ("PDA"), or any other portable device configured to communicate over a network and display information. The user device 240 may perform functions unrelated to the monitoring system, such as placing personal telephone calls, playing music, playing video, displaying pictures, browsing the Internet, or maintaining an electronic calendar, etc.

The video recorder 150 may be a computing device. For example, the video recorder 150 may be a computer that is located in a property that is being monitored. The video recorder 150 may include a viewing tracker 152 that tracks which portions of video that are watched, a viewing frequency engine 154 that determines frequencies that portions of the video are watched, and a video quality selector 156 that selects video qualities to use to record video during various time ranges. For example, the viewing tracker 152 may store viewing information that indicates which time ranges of video were watched by the user 120, the viewing frequency engine 154 may determine that a time range of Thursday 6-9 PM was most frequently viewed or presented on a display on the user device 110, and the video quality selector 156 may then transmit an instruction on Thursday at 6 PM to the camera 130 to start recording at 4K video quality and then transmits an instruction on Thursday at 9 PM to the camera 130 to start recording at 1080P video quality.

The video recorder 150 may select video qualities that differ based on one or more of resolution, frame rate, image quality, and bit rate. For example, high quality may correspond to fifteen frames per second, middle quality may correspond to ten frames per second, and low quality may correspond to five frames per second. In another example, high quality may correspond to forty megabits per second and low quality may correspond to ten megabits per second.

The viewing tracker 152 may track which portions of video are watched by the user 120. For example, the viewing tracker 152 may track each time the user 120 watches video using the user device 110. The viewing tracker 152 may generate viewing information that indicates which portions of video were viewed. For example, the viewing information may indicate that video from all Monday, all Tuesday, and Thursday night during a first week were watched, video from all Thursday and all Friday during a second week were watched, video from all Tuesday during a third week was watched, and video from all Thursday during a fourth week were watched.

The viewing frequency engine 154 may determine a viewing frequency that reflects a frequency that portions of video were watched based on the viewing information. For example, the viewing frequency engine 154 may determine that video from Thursday nights was watched at a high frequency, video from all Tuesday, Thursday afternoon, and Friday morning was watched at a medium frequency, video from all Monday, Thursday morning, and Friday night was watched at a low frequency, and video from other time ranges were not watched at all during a four week period.

The video quality selector 156 may select the video quality to record video based on the viewing frequency. For example, on Monday at 7 AM the video quality selector 156 may instruct the camera 130 to capture video at 720P based on the medium frequency determined and Monday at 12 PM the video quality selector 156 may instruct the camera 130 to capture video at 480P based on the low frequency determined.

In some implementations, the video quality selector 156 may select the video quality for time ranges based on mapping the viewing frequency of the time ranges to video quality. For example, the video quality selector 156 may map high frequency to high quality, medium frequency to medium quality, and low frequency to low quality.

In some implementations, the viewing tracker can maintain historical viewing data for use determining a video quality. For instance, the viewing tracker 152 can store, for one or more past instances of a repeating time range, viewing information that identifies a number of times a user accessed the one or more portions of the video. The viewing frequency engine 154 can obtain the viewing information and determine, for the repeating time range and using the viewing information, the frequency with which the user accessed the one or more portions of the video. Each portion from the one or more portions of the video can be for a corresponding one of the one or more past instances of the repeating time range. For example, with reference to FIG. 1, the video quality selector 156 can select multiple video qualities for a week based on the cumulative viewing information from the previous four weeks. Portions of time when a user 120 accessed video once, twice, or thrice over the previous four week period can be classified as low, middle, and high frequency, respectively.

In some implementations, each repeating time range can be treated separately in the process of selecting video quality. The viewing frequency engine 154 can determine, for each of two or more repeating time ranges, a respective frequency with which one or more respective portions of the video were accessed. Each respective portion can correspond to one of the one or more past instances of the respective repeating time range. The video quality selector 156 can select, for each of the two or more repeating time ranges, a respective video quality from the multiple video qualities. At least two repeating time ranges in the two or more repeating time ranges can have different respective video qualities. Storing the additional portions of video can include storing in memory and for each of the two or more repeating time ranges, respective additional portions of the video captured by the camera during respective future instances of the respective repeating time range at the respective video quality.

In some implementations, the video recorder 150 may consider additional factors when selecting the video quality for video captured by the camera 130. The video recorder 150 may weight recent viewing by the user 120 more than older viewing by the user 120. For example, the video recorder 150 may use only a predetermined period of time for the repeating range, e. g., the four most recent weeks, for determining the viewing frequency even though the user viewed older weeks, and weight each week of the four weeks similarly. In another example, the video recorder 150 may only use the six most recent weeks for determining the viewing frequency, and weight each week 25% less than the prior week.

In some implementations, the video recorder 150 may consider how many times video for a time range in a particular week was viewed in selecting the video quality for that time range. For example, the video quality selector 156 may determine that Monday morning video was watched only last week out of the past four weeks but the Monday morning video was watched ten times and, in response, select to use high quality to record Monday morning instead of selecting low quality.

In some implementations, if the viewing tracker 152 detects that a user 120 accesses a recording stored in low quality, the video quality selector 156 can automatically increase the video quality during the associated time of the recording. For example, if the video recorder 150 recorded high quality video from 5-9 PM on Tuesday and low quality video for the remaining portion of the week, and a user viewed a low quality recording from Wednesday from 8-9 AM, the video quality selector could automatically add Wednesday from 8-9 AM to the already scheduled high quality recordings from 5-9 PM on Tuesday.

In some implementations, the video recorder 150 may consider holidays in determining the video quality. For example, the video recorder 150 may determine that a current day is a holiday so record video at high quality regardless of the viewing frequency for the day. In some implementations, the video recorder 150 can consider the time of year in determining the video quality. For example, if a user 120 typically views video corresponding to nighttime in the summer, e. g., 9 PM-6 AM, the video quality selector 156 can expand the time range of high-quality recording to cover nighttime in the winter, e. g., 5 PM-7 AM, as the number of hours of daylight changes. For example, the video recorder 150 can take daylight savings into account if the viewing frequency engine 154 can detect that the viewing information of a user 120 tends to be correlated with hours of daylight.

In some implementations, the video recorder 150 may determine similarities between other users of other video recorders and determine the video quality based on viewing frequency for the other users. For example, the video recorder 150 may determine that frequent viewing of video of 1-3 PM on Thursday and Friday for the user 120 is similar to some other users of other systems that monitor other properties, that those other users also watch video of 1-3 PM on Wednesday, and, in response, determine to store high quality video also for 1-3 PM on Wednesday. Considering the behavior of other users can be useful with a relatively new user for whom the viewing frequency engine 154 has little viewing information to use when determining frequencies for repeating time ranges, selecting video qualities, or both.

In some implementations, the video recorder 150 may store video captured by multiple cameras, determine video quality for each of the multiple cameras based on viewing information for video captured by the cameras, and instruct the multiple cameras based on the video qualities determined. For example, the video recorder 150 may store video from a second camera and determine that video from the second camera is never watched and, in response, instruct the second camera to provide low quality video.

While FIG. 1 shows only a single user, the system 100 may be used by multiple different users. For example, the viewing tracker 152 may track all users' viewing patterns, and the viewing frequency engine 154 may combine the viewing patterns to determine a single viewing frequency, and the video quality selector 156 may then determine a single video quality schedule based on the single viewing frequency.

In some implementations, the viewing information associated with one user can impact the video quality selection more than the viewing information of another user. For example, a parent and child can both be users. The viewing tracker 152 can log whether a parent or child views recordings, and the viewing frequency engine 154 can keep track of the frequencies associated with each user. The video quality selector 156 can weigh the viewing information and viewing frequency associated with the parent more heavily than those associated with the child when selecting the video quality.

The video quality selector 156 may determine that a current time corresponds to a time when video quality changes and, in response, transmit an instruction to the camera 130. For example, the video quality selector 156 may transmit an instruction to the camera 130 when the selected video quality for a time range that includes the current time is different than a current video quality at which the camera 130 is recording. Then the camera 130 can capture the one or more additional portions of the video at the second video quality. In some implementations, a server or cloud system, e.g., either of which includes the video quality selector 156, can send instructions to the camera to cause the camera to capture the one or more additional portions of the video at the second video quality.

In some examples, when deciding how to store portions of video corresponding to a time when video quality should change according to instructions from the video quality selector 156, the video recorder 150 can determine whether to compress the one or more additional portions of the video captured by the camera 130 during future instances of the repeating time range from a first video quality to the second, e. g., higher to lower, video quality. For instance, instead of or in addition to sending an instruction to cause the camera to capture video at a different video quality, the video recorder 150 can compress a captured video portion at a different video quality than other video portions.

In some implementations, the video quality selector 156 may use three or more video qualities. For instance, the video quality selector 156 can generate a video quality schedule using the viewing frequency and transmit the video quality schedule to the camera 130. For example, the video quality selector 156 may generate a weekly schedule that indicates during a week, what video quality to use when providing the video to the video recorder 150. The camera 130 may then change the video quality of video transmitted to the video recorder 150 for storage during the week based on the video quality schedule stored on the camera 130. The video quality schedule can include multiple, different video qualities, e. g., low, medium, and high.

In some implementations, the video recorder 150 can determine that a first portion of the one or more portions of the video has a first frequency that satisfies a threshold and should be maintained at the first video quality. The video recorder 150 can determine that a second portion of the one or more portions of the video has a second frequency that does not satisfy the threshold and should be maintained at the second video quality. The second portion can be adjacent to the first portion in the video. The video recorder 150 can: select, from the second portion, a third portion of the video that is adjacent to the first portion; and select, for a second repeating time range for the third portion that is adjacent to the first portion and the second portions, a third video quality from the three or more video qualities that includes the first video quality and the second video quality. The third video quality can be a different video quality than the first video quality and the second video quality. The video recorder 150 can store, in memory, one or more third portions of the video a) captured by the camera 130 during future instances of the second repeating time range b) at the third video quality.

In some implementations, determining whether to use the three or more video qualities to store different portions of the video uses the frequency with which one or more portions of the video were accessed, a duration of the first portion, a duration of the second portion, or a combination of these.

In some implementations, the video recorder 150 can determine to record video at an adjusted quality for periods before and after repeating time ranges corresponding to high video quality. For example, the video quality selector 156 can determine to record at a high video quality on Wednesday from 7-8 PM. If a period of time, e. g., five minutes, before and after 7-8 PM on Wednesday normally corresponds to a low video quality, the video recorder 150 can determine to record those periods of time, e. g., 6:55-7:00 PM and 8:00-8:05 PM, at a higher video quality, e. g., a middle or the high video quality.

Additionally or alternatively, the camera 130 may provide high quality video to the video recorder 150 at all times, and the video recorder 150 may then store the video at the same or lower video quality based on the video quality selected for the time range. For example, the video quality selector 156 may not instruct the camera 130 to change video quality and may itself downsample or compress video from the camera 130 as appropriate based on the selected video quality.

Additionally or alternatively, the functionality of the video recorder 150 may be implemented in the camera 130. For example, the camera 130 may include the viewing tracker 152, the viewing frequency engine 154, and the video quality selector 156. For example, the camera 130 may generate the viewing information for different repeating time ranges, determine the viewing frequency for the different repeating time ranges, select the video qualities for the different repeating time ranges, and then store video on a memory card in the camera 130 based on the video qualities selected for the different repeating time ranges.

Figure 2:
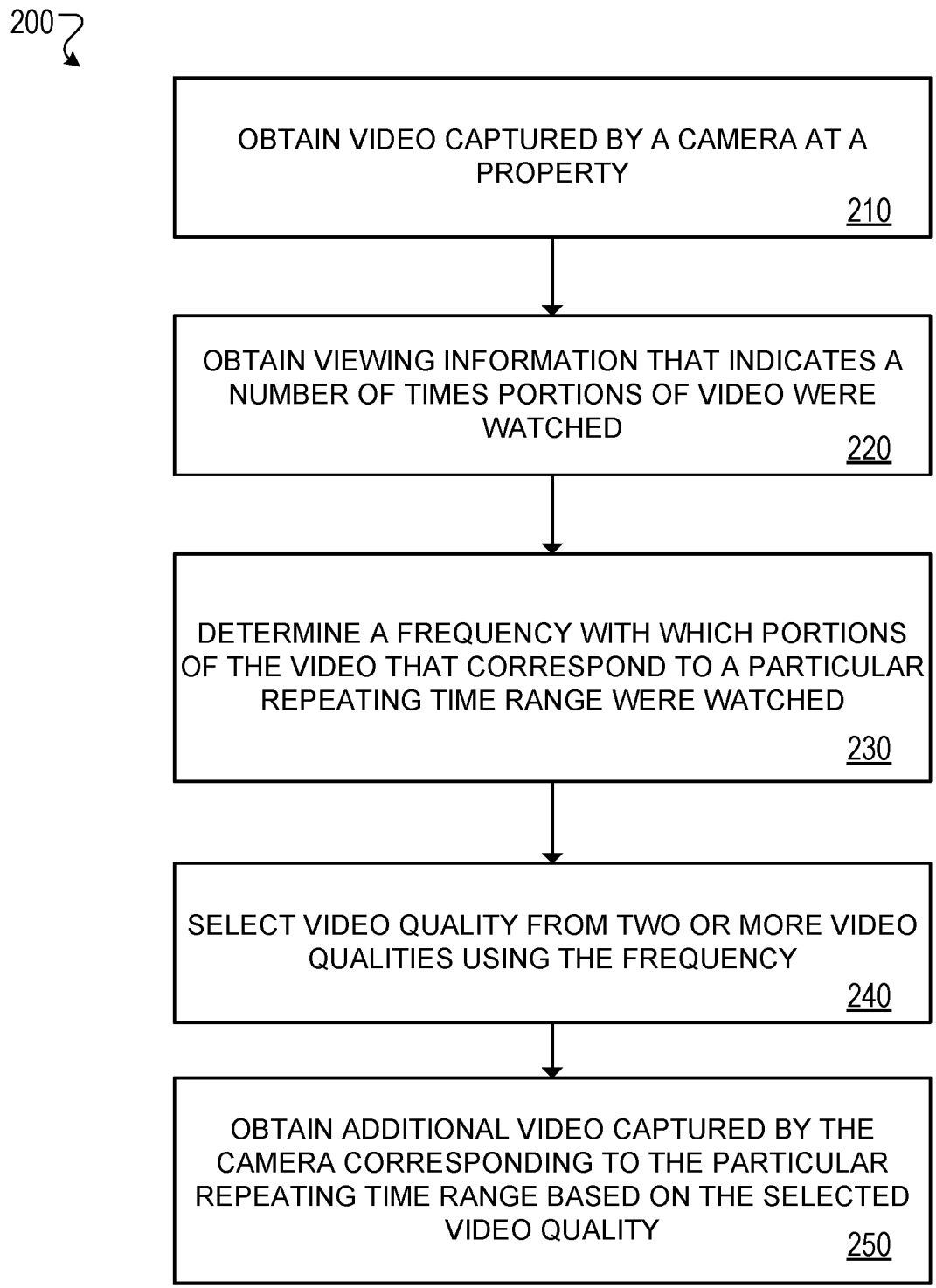
FIG. 2 is a flow diagram of an example process for scheduling recording video quality.

FIG. 2 is a flow diagram of an example process 200 for scheduling recording video quality. Process 200 can be implemented using system 100 described above. Thus, descriptions of process 200 may reference one or more of the above-mentioned components, modules, or computational devices of system 100. In some implementations, described actions of process 200 are enabled by computing logic or software instructions executable by a processor and memory of an example electronic device.

The process 200 includes obtaining video captured by a camera at a property (210). For example, the video recorder 150 may obtain video captured by the camera 130 during a six week period.

The process 200 includes obtaining viewing information that indicates a number of times portions of video that were watched (220). For example, the viewing tracker 152 may generate viewing information that indicates how many times each time range of a week was viewed during the six week period. In some implementations, the viewing tracker 152 can keep track of which users watched portions of video of different times.

The process 200 includes determining a frequency that portions of the video that correspond to a particular repeating time range were watched (230). For example, the viewing frequency engine 154 may determine that a first set of time ranges of a week were not viewed at all during the six weeks, a second set of time ranges of a week were viewed for one of the six weeks, and a third set of time ranges of a week were viewed for two of the six weeks, etc. In some implementations, the viewing frequency engine 154 can calculate the viewing frequency of each user and create a composite frequency. In some implementations, the composite frequency can weight the viewing information of certain users more heavily, e. g., weighing the viewing information of a parent more than child when calculating the composite frequency.

The process 200 includes determining a video quality using the frequency (240). For example, the video quality selector 156 may determine to record at five frames per second for time ranges of a week watched less than two of the six weeks, record at ten frames per second for time ranges of a week watched between two to four of the six weeks, and record at fifteen frames per second for time ranges of a week watched more than four of the six weeks. In some implementations, the video quality selector 156 can use the viewing frequency, viewing information from other users, a schedule that the user selected, or a combination of two or more of these, when determining the video quality.

The process 200 includes obtaining additional video captured by the camera corresponding to the particular repeating time range based on the selected video quality (250). For example, the video recorder 150 may store video, captured in the future by the camera 130 during the time ranges of a week watched less than two of the six weeks, at five frames per second.

In some implementations, the process 200 can include additional steps, fewer steps, or some of the steps can be divided into multiple steps. For example, in some implementations, the video recorder 150 can continue to obtain additional video captured at a high video quality after step 240 and then compress the recordings to an appropriate lower quality according to the particular repeating time range based on the selected video quality at a later time. For example, the video recorder 150 can compress videos it receives periodically, e. g., at the end of every day, instead of compressing video every time the camera 130 obtains video of a property.

In some implementations, an additional step of deleting viewing information that predates a predetermined time occurs before step 220 or after step 250.

In some implementations, step 220 can be divided into obtaining viewing information associated with a particular user in viewing information associated with similar users.

In some implementations, step 210 can occur after step 220. For example, the viewing tracker 152 can obtain viewing information and compute a schedule or timetable so that the video quality selector 156 does not have to update the schedule of video quality every time the camera 130 obtains video of a property, e. g., the video quality schedule can update once a day.

Figure 3:
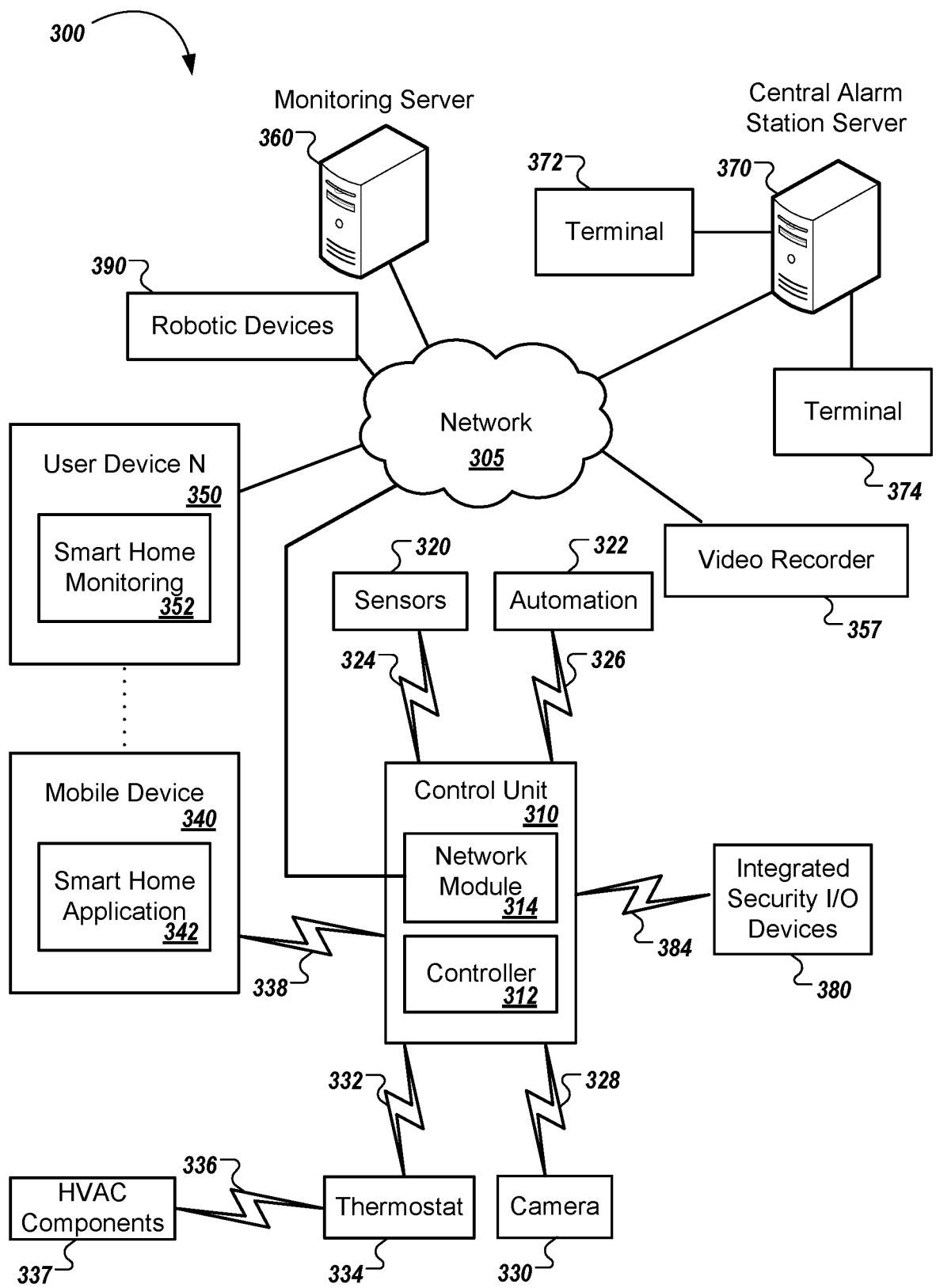
FIG. 3 is a diagram illustrating an example of a home monitoring system.

FIG. 3 is a diagram illustrating an example of a home monitoring system 300. The home monitoring system 300 includes a network 305, a control unit 310, one or more user devices 340 and 350, a monitoring server 360, and a central alarm station server 370. In some examples, the network 305 facilitates communications between the control unit 310, the one or more user devices 340 and 350, the monitoring server 360, and the central alarm station server 370.

The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors. For example, the monitoring system 300 may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health monitoring sensor can be a wearable sensor that attaches to a user in the home. The health monitoring sensor can collect various health data, including pulse, heart-rate, respiration rate, sugar or glucose level, bodily temperature, or motion data. The sensors 320 can also include a radio-frequency identification (RFID) sensor that identifies a particular article that includes a pre-assigned RFID tag.

The control unit 310 communicates with the home automation controls 322 and a camera 330 to perform monitoring. The home automation controls 322 are connected to one or more devices that enable automation of actions in the home. For instance, the home automation controls 322 may be connected to one or more lighting systems and may be configured to control operation of the one or more lighting systems. Also, the home automation controls 322 may be connected to one or more electronic locks at the home and may be configured to control operation of the one or more electronic locks (e.g., control Z-Wave locks using wireless communications in the Z-Wave protocol). Further, the home automation controls 322 may be connected to one or more appliances at the home and may be configured to control operation of the one or more appliances. The home automation controls 322 may include multiple modules that are each specific to the type of device being controlled in an automated manner. The home automation controls 322 may control the one or more devices based on commands received from the control unit 310. For instance, the home automation controls 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building or home monitored by the control unit 310. The camera 330 may be configured to capture single, static images of the area or video images of the area in which multiple images of the area are captured at a relatively high frequency (e.g., thirty images per second) or both. The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PIR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the home automation controls 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries, e.g., if located remotely from the control unit 310. The camera 330 may employ a small solar cell to recharge the battery when light is available. The camera 330 may be powered by the controller's 312 power supply if the camera 330 is co-located with the controller 312.

In some implementations, the camera 330 communicates directly with the monitoring server 360 over the Internet. In these implementations, image data captured by the camera 330 does not pass through the control unit 310 and the camera 330 receives commands related to operation from the monitoring server 360.

The system 300 also includes thermostat 334 to perform dynamic environmental control at the home. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a home and/or environmental data at a home, e.g., at various locations indoors and outdoors at the home. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more home automation controls 322.

A module 337 is connected to one or more components of an HVAC system associated with a home, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

The system 300 includes video recorder 357. The video recorder 357 can be computing devices (e.g., a computer, microcontroller, FPGA, ASIC, or other device capable of electronic computation) capable of receiving data related to the video recorder and communicating electronically with the monitoring system control unit 310.

In some examples, the system 300 further includes one or more robotic devices 390. The robotic devices 390 may be any type of robots that are capable of moving and taking actions that assist in home monitoring. For example, the robotic devices 390 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and also roll along the ground, walls, or ceiling) and land vehicle type devices (e.g., automated cars that drive around a home). In some cases, the robotic devices 390 may be robotic devices 390 that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a home. In these examples, the robotic devices 390 include sensors and control processors that guide movement of the robotic devices 390 within the home. For instance, the robotic devices 390 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the home and guide movement of the robotic devices 390 in a manner that avoids the walls and other obstacles.

In addition, the robotic devices 390 may store data that describes attributes of the home. For instance, the robotic devices 390 may store a floorplan and/or a three-dimensional model of the home that enables the robotic devices 390 to navigate the home. During initial configuration, the robotic devices 390 may receive the data describing attributes of the home, determine a frame of reference to the data (e.g., a home or reference location in the home), and navigate the home based on the frame of reference and the data describing attributes of the home. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensor that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the home. The communication module further may be a 900 MHz wireless communication module that enables the robotic devices 390 to communicate directly with the control unit 310. Other types of short-range wireless communication protocols, such as Bluetooth, Bluetooth LE, Z-wave, Zig-Bee, etc., may be used to allow the robotic devices 390 to communicate with other devices in the home. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid-state electronic storage that enables the robotic devices 390 to store applications, configuration data, collected sensor data, and/or any other type of information available to the robotic devices 390.

The robotic devices 390 are associated with one or more charging stations. The charging stations may be located at predefined home base or reference locations in the home. The robotic devices 390 may be configured to navigate to the charging stations after completion of tasks needed to be performed for the home monitoring system 300. For instance, after completion of a monitoring operation or upon instruction by the control unit 310, the robotic devices 390 may be configured to automatically fly to and land on one of the charging stations. In this regard, the robotic devices 390 may automatically maintain a fully charged battery in a state in which the robotic devices 390 are ready for use by the home monitoring system 300.

The charging stations may be contact based charging stations and/or wireless charging stations. For contact based charging stations, the robotic devices 390 may have readily accessible points of contact that the robotic devices 390 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the home may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device may always use a first charging station and a second robotic device may always use a second charging station.

In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the home that is not associated with a charger. The number of community charging stations may be less than the number of robotic devices 390.

Also, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive sensor data from the sensors 320 and determine whether to provide an alert to the one or more integrated security input/output devices 380.

The sensors 320, the home automation controls 322, the camera 330, the thermostat 334, and the integrated security devices 380 may communicate with the controller 312 over communication links 324, 326, 328, 332, 338, and 384. The communication links 324, 326, 328, 332, 338, and 384 may be a wired or wireless data pathway configured to transmit signals from the sensors 320, the home automation controls 322, the camera 330, the thermostat 334, and the integrated security devices 380 to the controller 312. The sensors 320, the home automation controls 322, the camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 324, 326, 328, 332, 338, and 384 may include a local network. The sensors 320, the home automation controls 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, ZigBee, Bluetooth, "HomePlug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 360 is an electronic device configured to provide monitoring services by exchanging electronic communications with the control unit 310, the one or more user devices 340 and 350, and the central alarm station server 370 over the network 305. For example, the monitoring server 360 may be configured to monitor events (e.g., alarm events) generated by the control unit 310. In this example, the monitoring server 360 may exchange electronic communications with the network module 314 included in the control unit 310 to receive information regarding events (e.g., alerts) detected by the control unit 310. The monitoring server 360 also may receive information regarding events (e.g., alerts) from the one or more user devices 340 and 350.

In some examples, the monitoring server 360 may route alert data received from the network module 314 or the one or more user devices 340 and 350 to the central alarm station server 370. For example, the monitoring server 360 may transmit the alert data to the central alarm station server 370 over the network 305.

The monitoring server 360 may store sensor and image data received from the monitoring system 300 and perform analysis of sensor and image data received from the monitoring system 300. Based on the analysis, the monitoring server 360 may communicate with and control aspects of the control unit 310 or the one or more user devices 340 and 350.

The monitoring server 360 may provide various monitoring services to the system 300. For example, the monitoring server 360 may analyze the sensor, image, and other data to determine an activity pattern of a resident of the home monitored by the system 300. In some implementations, the monitoring server 360 may analyze the data for alarm conditions or may determine and perform actions at the home by issuing commands to one or more of the home automation controls 322, possibly through the control unit 310.

The central alarm station server 370 is an electronic device configured to provide alarm monitoring service by exchanging communications with the control unit 310, the one or more mobile devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more mobile devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the smart home application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a smart home application 342. The smart home application 342 refers to a software/firmware program running on the corresponding mobile device that enables the user interface and features described throughout. The user device 340 may load or install the smart home application 342 based on data received over a network or data received from local media. The smart home application 342 runs on mobile devices platforms, such as iPhone, iPod touch, Blackberry, Google Android, Windows Mobile, etc. The smart home application 342 enables the user device 340 to receive and process image and sensor data from the monitoring system.

The user device 350 may be a general-purpose computer (e.g., a desktop personal computer, a workstation, or a laptop computer) that is configured to communicate with the monitoring server 360 and/or the control unit 310 over the network 305. The user device 350 may be configured to display a smart home user interface 352 that is generated by the user device 350 or generated by the monitoring server 360. For example, the user device 350 may be configured to display a user interface (e.g., a web page) provided by the monitoring server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, ZigBee, HomePlug (Ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through communication link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the home automation controls 322, the camera 330, the robotic devices 390, and the video recorder 357. The one or more user devices 340 and 350 receive data directly from the sensors 320, the home automation controls 322, the camera 330, the robotic devices 390, and the video recorder 357 and sends data directly to the sensors 320, the home automation controls 322, the camera 330, the robotic devices 390, and the video recorder 357. The one or more user devices 340, 350 provide the appropriate interfaces/processing to provide visual surveillance and reporting.

In other implementations, the system 300 further includes network 305 and the sensors 320, the home automation controls 322, the camera 330, the thermostat 334, the robotic devices 390, and the video recorder 357 are configured to communicate sensor and image data to the one or more user devices 340 and 350 over network 305 (e.g., the Internet, cellular network, etc.). In yet another implementation, the sensors 320, the home automation controls 322, the camera 330, the thermostat 334, the robotic devices 390, and the video recorder 357 (or a component, such as a bridge/router) are intelligent enough to change the communication pathway from a direct local pathway when the one or more user devices 340 and 350 are in close physical proximity to the sensors 320, the home automation controls 322, the camera 330, the thermostat 334, the robotic devices 390, and the video recorder 357 to a pathway over network 305 when the one or more user devices 340 and 350 are farther from the sensors 320, the home automation controls 322, the camera 330, the thermostat 334, the robotic devices 390, and the video recorder 357. In some examples, the system leverages GPS information from the one or more user devices 340 and 350 to determine whether the one or more user devices 340 and 350 are close enough to the sensors 320, the home automation controls 322, the camera 330, the thermostat 334, the robotic devices 390, and the video recorder 357 to use the direct local pathway or whether the one or more user devices 340 and 350 are far enough from the sensors 320, the home automation controls 322, the camera 330, the thermostat 334, the robotic devices 390, and the video recorder 357 that the pathway over network 305 is required. In other examples, the system leverages status communications (e.g., pinging) between the one or more user devices 340 and 350 and the sensors 320, the home automation controls 322, the camera 330, the thermostat 334, the robotic devices 390, and the video recorder 357 to determine whether communication using the direct local pathway is possible. If communication using the direct local pathway is possible, the one or more user devices 340 and 350 communicate with the sensors 320, the home automation controls 322, the camera 330, the thermostat 334, the robotic devices 390, and the video recorder 357 using the direct local pathway. If communication using the direct local pathway is not possible, the one or more user devices 340 and 350 communicate with the sensors 320, the home automation controls 322, the camera 330, the thermostat 334, the robotic devices 390, and the video recorder 357 using the pathway over network 305.

In some implementations, the system 300 provides end users with access to images captured by the camera 330 to aid in decision-making. The system 300 may transmit the images captured by the camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system 300 and other events sensed by the monitoring system 300 may be used to enable/disable video/image recording devices (e.g., the camera 330). In these implementations, the camera 330 may be set to capture images on a periodic basis when the alarm system is armed in an "away" state, but set not to capture images when the alarm system is armed in a "home" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   determining, for a repeating time range of a video with a first video quality, a frequency with which one or more portions of the video were accessed, each portion for a corresponding one of one or more past instances of the repeating time range;
   selecting, for the repeating time range and using the frequency with which the portion of the video for the repeating time range was accessed, a second video quality from two or more video qualities that includes the first video quality; and
   storing, in memory, one or more additional portions of the video i) captured by a camera during future instances of the repeating time range ii) at the second video quality.

2. The method of claim 1, wherein determining the frequency comprises determining the frequency with which the one or more portions of the video were presented on a display, each portion for a corresponding one of the one or more past instances of the repeating time range.

3. The method of claim 1, wherein:
   the first video quality has a first resolution, a first frame rate, a first image quality, and a first bit rate;
   selecting the second video quality comprises selecting the second video quality that has a second resolution, a second frame rate, a second image quality, and a second bit rate; and
   storing the one or more additional portions of the video comprises storing, in memory, the one or more additional portions of the video i) captured by the camera during future instances of the repeating time range ii) at the second resolution, the second frame rate, the second image quality, and the second bit rate.

4. The method of claim 1, wherein:
   storing the one or more additional portions of the video comprises determining to compress the one or more additional portions of the video i) captured by the camera during future instances of the repeating time range ii) from the first video quality to the second video quality.

5. The method of claim 1, comprising:
   obtaining, for the one or more past instances of the repeating time range, viewing information that identifies a number of times the one or more portions of the video were accessed,
   wherein determining the frequency comprises determining, for the repeating time range and using the viewing information, the frequency with which the one or more portions of the video were accessed, each portion for a corresponding one of the one or more past instances of the repeating time range.

6. The method of claim 1, wherein determining the frequency comprises determining the frequency with which the one or more portions of the video were accessed, each portion for a corresponding one of the one or more past instances of the repeating time range from a predetermined period of time.

7. The method of claim 1, comprising:
capturing, by the camera, the one or more additional portions of the video at the second video quality.

8. The method of claim 1, comprising:
sending, to the camera, an instruction to cause the camera to capture the one or more additional portions of the video at the second video quality.

9. The method of claim 1, wherein:
determining the frequency comprises determining, for each of two or more of repeating time ranges including the repeating time range, a respective frequency with which one or more respective portions of the video were accessed, each respective portion for a corresponding one of the one or more past instances of the respective repeating time range;
selecting the second video quality comprises selecting, for each of the two or more repeating time ranges including the repeating time range, a respective video quality from the two or more video qualities, at least two repeating time ranges in the two or more repeating time ranges having different respective video qualities; and
storing the one or more additional portions of the video comprises storing, in memory and for each of the two or more repeating time ranges, one or more respective additional portions of the video i) captured by the camera during respective future instances of the respective repeating time range ii) at the respective video quality.

10. The method of claim 1, comprising:
determining whether to use three or more video qualities to store different portions of the video;
in response to determining to use three or more video qualities to store different portions of the video:
determining that a first portion of the one or more portions of the video has a first frequency that satisfies a threshold and should be maintained at the first video quality;
determining that a second portion of the one or more portions of the video has a second frequency that does not satisfy the threshold and should be maintained at the second video quality, wherein the second portion is adjacent to the first portion in the video;
selecting, from the second portion, a third portion of the video that is adjacent to the first portion; and
selecting, for a second repeating time range for the third portion that is adjacent to the first portion and the second portions, a third video quality from the three or more video qualities that includes the first video quality and the second video quality, wherein the third video quality is a different video quality than the first video quality and the second video quality; and
storing, in memory, one or more third portions of the video a) captured by the camera during future instances of the second repeating time range b) at the third video quality.

11. The method of claim 10, wherein determining whether to use the three or more video qualities to store different portions of the video uses the frequency with which one or more portions of the video were accessed.

12. The method of claim 10, wherein determining whether to use the three or more video qualities to store different portions of the video uses a duration of the first portion, a duration of the second portion, or both.

13. The method of claim 1, wherein the second video quality is different from the first video quality.

14. The method of claim 13, wherein the second video quality is a lower video quality than the first video quality.

15. The method of claim 13, wherein the second video quality is a higher video quality than the first video quality.

16. A system comprising one or more computers and one or more storage devices on which are stored instructions that are operable, when executed by the one or more computers, to cause the one or more computers to perform operations comprising:
determining, for a repeating time range of a video with a first video quality, a frequency with which one or more portions of the video were accessed, each portion for a corresponding one of one or more past instances of the repeating time range;
selecting, for the repeating time range and using the frequency with which the portion of the video for the repeating time range was accessed, a second video quality from two or more video qualities that includes the first video quality; and
storing, in memory, one or more additional portions of the video i) captured by a camera during future instances of the repeating time range ii) at the second video quality.

17. The system of claim 16, wherein determining the frequency comprises determining the frequency with which the one or more portions of the video were presented on a display, each portion for a corresponding one of the one or more past instances of the repeating time range.

18. The system of claim 16, wherein:
the first video quality has a first resolution, a first frame rate, a first image quality, and a first bit rate;
selecting the second video quality comprises selecting the second video quality that has a second resolution, a second frame rate, a second image quality, and a second bit rate; and
storing the one or more additional portions of the video comprises storing, in memory, the one or more additional portions of the video i) captured by the camera during future instances of the repeating time range ii) at the second resolution, the second frame rate, the second image quality, and the second bit rate.

19. The system of claim 16, wherein:
storing the one or more additional portions of the video comprises determining to compress the one or more additional portions of the video i) captured by the camera during future instances of the repeating time range ii) from the first video quality to the second video quality.

20. A non-transitory computer storage medium encoded with instructions that, when executed by one or more computers, cause the one or more computers to perform operations comprising:
determining, for a repeating time range of a video with a first video quality, a frequency with which one or more portions of the video were accessed, each portion for a corresponding one of one or more past instances of the repeating time range;
selecting, for the repeating time range and using the frequency with which the portion of the video for the repeating time range was accessed, a second video quality from two or more video qualities that includes the first video quality; and
storing, in memory, one or more additional portions of the video i) captured by a camera during future instances of the repeating time range ii) at the second video quality.

* * * * *